Figure 1:
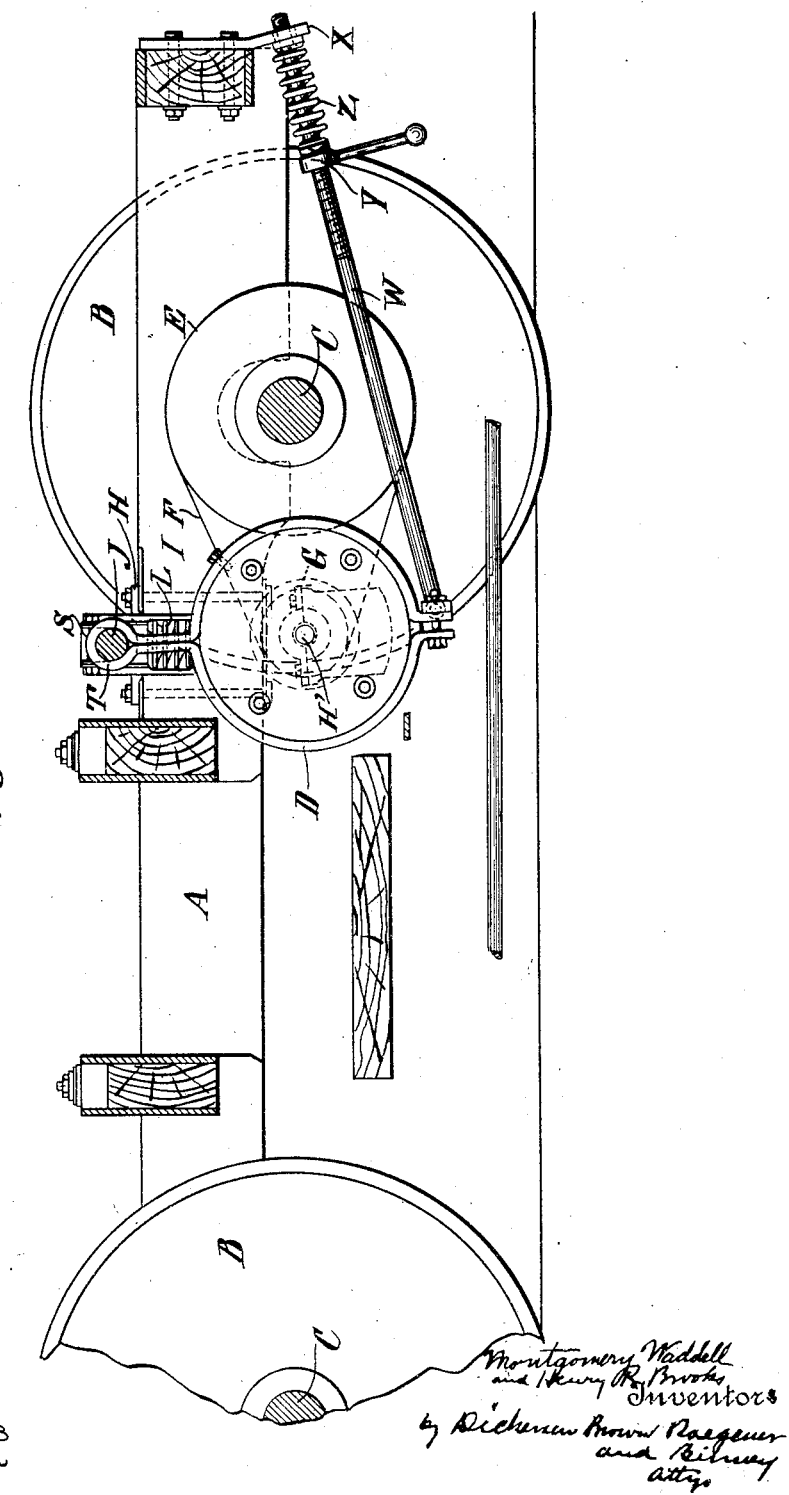

No. 746,610. PATENTED DEC. 8, 1903.
M. WADDELL & H. K. BROOKS.
GENERATOR OR MOTOR SUSPENSION.
APPLICATION FILED FEB. 24, 1903.
NO MODEL. 4 SHEETS—SHEET 2.
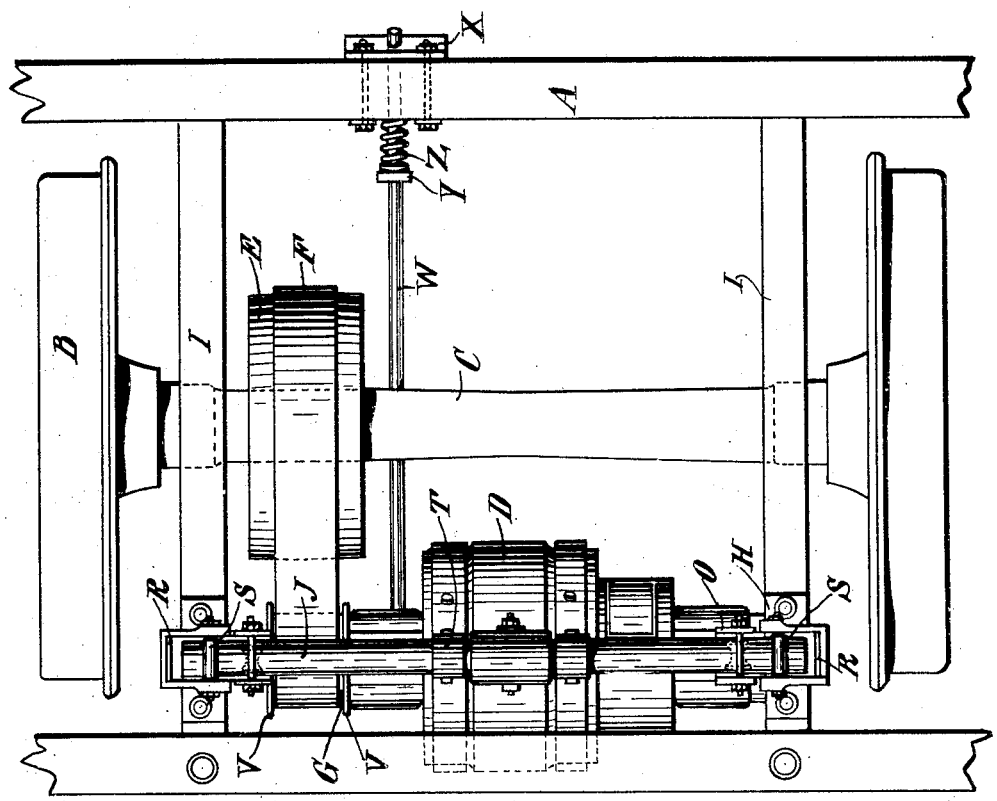
Fig. 2.
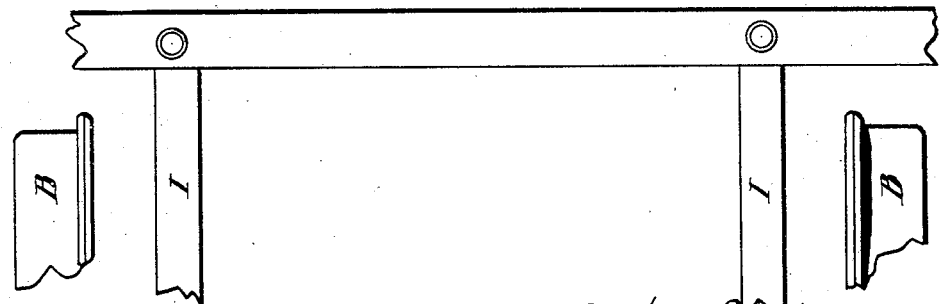
Witnesses
Montgomery Waddell
and Henry K. Brooks Inventors No. 746,610. PATENTED DEC. 8, 1903.
M. WADDELL & H. K. BROOKS.
GENERATOR OR MOTOR SUSPENSION.
APPLICATION FILED FEB. 24, 1903.
NO MODEL. 4 SHEETS—SHEET 3.
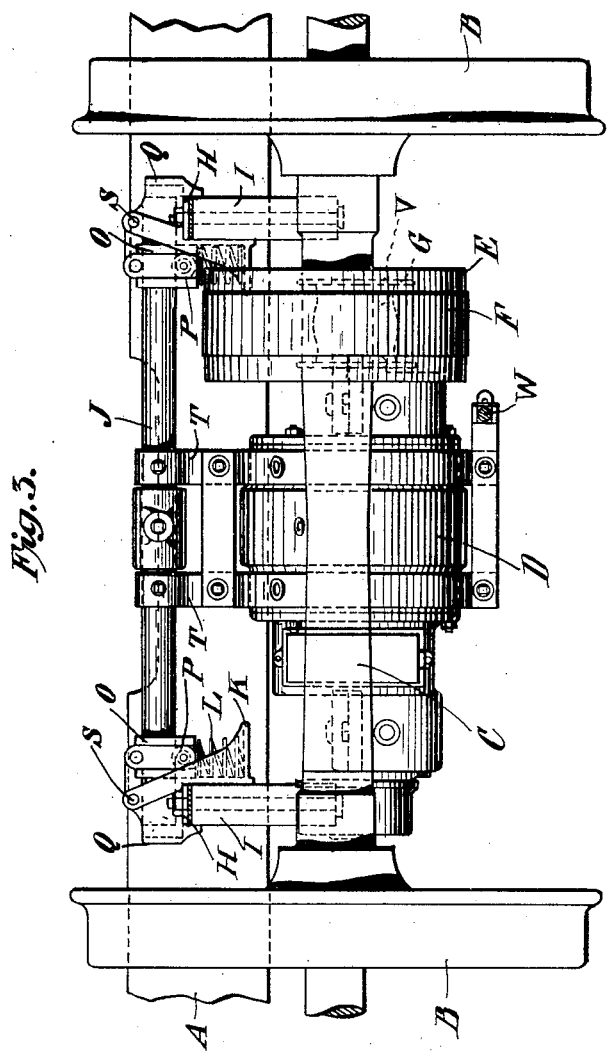

No. 746,610. PATENTED DEC. 8, 1903.
M. WADDELL & H. K. BROOKS.
GENERATOR OR MOTOR SUSPENSION.
APPLICATION FILED FEB. 24, 1903.
NO MODEL. 4 SHEETS—SHEET 4.
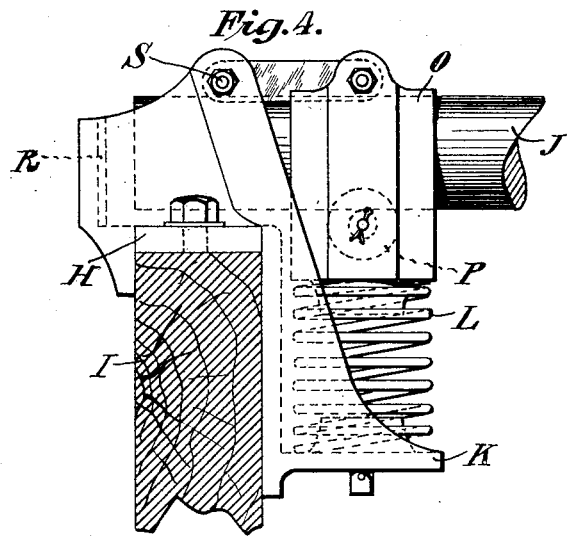
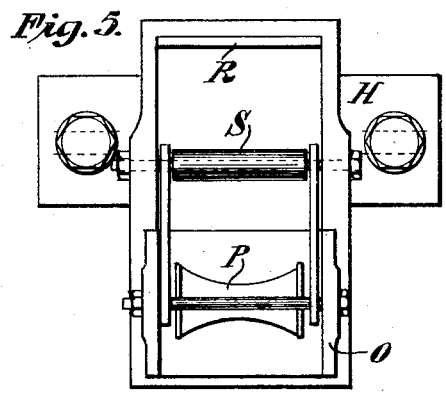
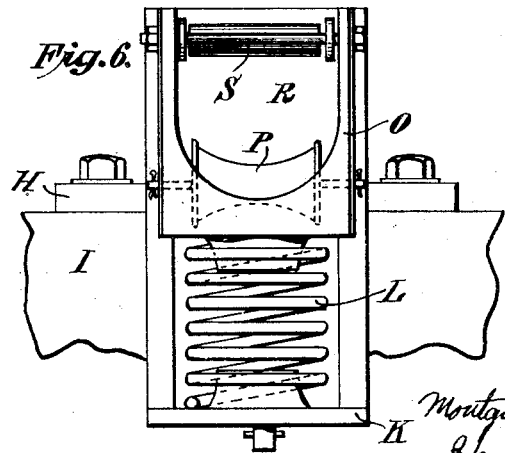

No. 746,610. Patented December 8, 1903.

UNITED STATES PATENT OFFICE.

MONTGOMERY WADDELL AND HENRY K. BROOKS, OF NEW YORK, N. Y., ASSIGNORS TO UNITED STATES LIGHT & HEATING COMPANY, OF NEW JERSEY.

GENERATOR OR MOTOR SUSPENSION.

SPECIFICATION forming part of Letters Patent No. 746,610, dated December 8, 1903.

Application filed February 24, 1903. Serial No. 144,602. (No model.)

*To all whom it may concern:*

Be it known that we, MONTGOMERY WADDELL, a subject of the King of Great Britain, and HENRY K. BROOKS, a citizen of the United States, both residents of the borough of Manhattan, city, county, and State of New York, have invented certain new and useful Improvements in Generator or Motor Suspension, of which the following is a specification accompanied by drawings.

This invention is more particularly applicable to electrical machines, such as generators or motors, suspended from car-trucks, although the invention may be used in any connection in which it is found suitable.

The objects of the invention are to improve upon means heretofore devised for suspending generators or motors from car-trucks or from other supports which are liable to jar and vibration, and suitable provision is afforded for cushioning the motor or generator in all directions. According to our construction a generator may have a certain movement in a vertical plane to guard against the shocks and jars incident to generators suspended from car-trucks and the generator may be swung to and from the driving-shaft or car-axle to take up the stretch of the belt when a belt is used for driving purposes, and provision is also thus afforded for compensating for irregularities and unevenness in the driving-pulleys with a belt-drive.

Another object of this invention is to enable the generator to have a lateral movement relatively to the car-frame.

Further objects of the invention will hereinafter appear; and to these ends the invention consists of apparatus for carrying out the above objects embodying the features of construction, combinations of elements, and arrangement of parts having the general mode of operation substantially as hereinafter fully described and claimed in this specification and shown in the accompanying drawings, in which—

Figure 1 is a side elevation, partly in section, of a truck provided with apparatus embodying the invention. Fig. 2 is a plan view of the same. Fig. 3 is an end view looking at the front of the truck. Fig. 4 is an enlarged detail view of a portion of the apparatus. Fig. 5 is a plan view of Fig. 4, and Fig. 6 is an end elevation of the portion of apparatus shown in Figs. 4 and 5 with the shaft removed.

Referring to the drawings, A represents the frame of the truck, provided with the wheels B upon the axles C. In this instance a generator D is suspended from the truck, although a motor may be suspended by the same means. Suitable means are provided for driving the armature of the generator from the axle C, in this instance a driving-pulley E being provided upon the axle connected by the belt F with the driven pulley G upon the armature-shaft H'.

Suitable brackets H are provided upon the wheel-guards I for supporting the transversely-extending beam J. According to this invention the beam J supports the generator D and is suitably cushioned, as hereinafter to be described. The beam J may also have movement transversely of the car-truck for a purpose hereinafter to appear. The brackets H are provided with the sockets K, affording steps or bearings for the springs L, which support the boxes or frames O and in which are journaled rollers P. The transversely-extending beam J is supported upon the rollers P and is of slightly shorter length than the distance between the outer ends Q of the brackets H, so that said beam J may have movement transversely of the car upon the rollers P. Suitable buffers R, which may be rubber blocks, are arranged within the brackets H, while cushioning-rollers S, shown as rubber-covered bolts, are arranged in the boxes O and above the beam J. According to this construction the beam J is cushioned in its movement transversely of the car, and it is also cushioned vertically against the rollers S.

The weight of the generator D is carried by the beam J, so that the generator is cushioned against vertical shocks or jars by the springs L, which may be of any suitable character, shown in this instance as coiled springs, although elliptical and other forms of springs may be utilized, as desired. The generator in this instance is hung in the supporting-straps T, which are tight upon the transverse beam J. The beam J may rotate about its own longitudinal axis and, as stated, may slide longitudinally on the rollers P. It will be seen, therefore, that the generator may have three independent movements, or, in other words, it may move vertically and horizontally, and it may also be rotated about the longitudinal axis of the beam J. The straps T are made fast to the beam J in order to maintain the armature-shaft substantially parallel to the axle and cross-beams when the generator is moved to and from the axle C, and since the direction of the belt is transverse to the axis of the beam J vertical movement of the generator may take place without affecting the tension on the belt F or causing it to slip upon the pulleys.

The driven pulley G is provided with flanges V at each side, between which the belt F runs. As the driving-pulley E on the axle C shifts laterally, the generator-shaft will also be shifted laterally to keep the belt substantially in the center of both pulleys. For this reason provision is afforded for lateral movement of the generator.

Means are provided for adjusting the generator to and from the axle C, as shown, the screw-threaded rod W being connected to the generator at one end and extending through the support X on the truck-frame at the other end. A suitable spring Z is maintained in compression between the support X and the adjustable stop Y, which is provided with a handle. According to this construction the spring acts to cushion the generator as it swings, and at the same time tends to force the rod W and generator away from the support X to maintain the desired tension upon the belt F.

According to this invention the weight of the generator is utilized to provide tension upon the belt. As shown, the generator is suspended slightly out of the perpendicular in such manner that its weight acts to provide tension upon the belt F. It will also be seen that the ends of the beam J project over the wheel-guards I, so that if for any reason one of the supporting-brackets Q or spring L should break the end of the rod J would rest upon the guard I.

Obviously some features of this invention may be used without others, and the invention may be embodied in widely-varying forms.

Therefore without limiting ourselves to the construction shown and described nor enumerating equivalents, we claim, and desire to obtain by Letters Patent, the following:

1. The combination with a truck, of springs carried thereby, a beam supported upon said springs and movable transversely of the truck, the ends of said beam projecting over the wheel-guards of the truck, and a motor or generator operatively connected to the axle and suspended from said beam, for substantially the purposes set forth.

2. The combination with a truck, of springs carried thereby, boxes supported on said springs, rollers journaled in said boxes, a beam resting upon said rollers and extending transversely of the car, whereby said beam may have movement in the direction of its length, and also about its longitudinal axis, and a motor or generator operatively connected to the axle and clamped tightly to said beam, for substantially the purposes set forth.

3. The combination with a truck, of a beam resiliently supported thereon and movable in the direction of its length transversely of the truck, a motor or generator operatively connected to the axle and suspended from said beam whereby the motor or generator may have both vertical and horizontal movement, a flanged pulley on the generator-shaft, a driving-pulley on the axle and a belt connecting said pulleys, for substantially the purposes set forth.

4. The combination with a truck, of springs carried thereby, boxes supported on said springs, a beam supported on said boxes and extending transversely of the car whereby said beam may have movement in the direction of its length and also about its longitudinal axis, and a motor or generator operatively connected to the axle and supported from said beam, for substantially the purposes set forth.

In testimony whereof we have signed this specification in the presence of two subscribing witnesses.

MONTGOMERY WADDELL.
HENRY K. BROOKS.

Witnesses:
A. L. O'BRIEN,
H. G. OGDEN, Jr.